United States Patent [19]
Nakamura et al.

[11] Patent Number: 4,534,686
[45] Date of Patent: Aug. 13, 1985

[54] SPINDLE HEAD UNIT
[75] Inventors: Kosei Nakamura; Yoshikazu Takano, both of Hino, Japan
[73] Assignee: Fanuc Ltd., Hino, Japan
[21] Appl. No.: 455,987
[22] Filed: Jan. 6, 1983
[30] Foreign Application Priority Data Jan. 8, 1982 [JP] Japan .................................. 57-1006
Jan. 8, 1982 [JP] Japan .................................. 57-1007

[51] Int. Cl.³ ............................................. B23B 19/02
[52] U.S. Cl. ................................. 409/135; 82/28 R; 82/DIG. 1; 310/59; 310/90; 409/231
[58] Field of Search ............... 409/135, 231; 82/28 R, 82/DIG. 1; 310/90, 58, 59

[56] References Cited

U.S. PATENT DOCUMENTS

| 2,251,442 | 8/1941 | Emmons | 82/DIG. 1 |
| 2,343,875 | 3/1944 | Schwartz | 409/135 |
| 3,590,292 | 6/1971 | Poliakoff | 310/90 |
| 3,717,779 | 2/1973 | Hallerback | 310/90 X |
| 3,916,231 | 10/1975 | Cathey | 310/90 X |
| 4,085,344 | 4/1978 | Eddens | 310/58 |
| 4,110,643 | 8/1978 | Müller | 310/59 X |
| 4,133,230 | 1/1979 | Inaba et al. | 82/28 R |
| 4,237,393 | 12/1980 | Landgtaf | 310/59 |
| 4,246,503 | 1/1981 | Fujioka et al. | 310/59 |
| 4,352,034 | 9/1982 | Karhan et al. | 310/59 |
| 4,406,959 | 9/1983 | Harano et al. | 310/58 |

FOREIGN PATENT DOCUMENTS 2500776  10/1982  France .................................. 82/28 R Primary Examiner—William R. Briggs
Assistant Examiner—Glenn L. Webb
Attorney, Agent, or Firm—Armstrong, Nikaido, Marmelstein & Kubovcik

[57] ABSTRACT

A motor-incorporated spindle head unit is provided with a rotatable spindle on which a rotor assembly of the motor is fixedly mounted. A stator assembly is arranged around the rotor assembly and is fixed to an outer framework of the spindle head unit in a cantilever fashion. A cooling system for cooling the stator assembly is formed by providing an annular gap between the outer framework and the periphery of the stator assembly and is adapted to permit cooling air introduced into the annular gap through air ports formed in an end of the outer framework to flow through at least a through-bore formed in the stator assembly.

4 Claims, 2 Drawing Figures

SPINDLE HEAD UNIT

BACKGROUND OF THE INVENTION

1. Field of the Invention

The present invention relates to a spindle head unit incorporating a spindle drive motor that has a rotor assembly rotably mounted on a spindle and a stator assembly fixedly arranged outside the rotor assembly. More particularly, the present invention relates to a spindle head unit having an improved structure enabling avoidance of thermal deformation of the spindle head unit due to heat from the spindle drive motor, when the spindle head unit is accommodated in diverse kinds of machine tools and operated for long periods of time.

2. Description of the Prior Art

Spindle head units incorporating drive motors, particularly, AC motors, for driving the spindles have come into wide use since they do not require rotation transmitting mechanisms and other auxiliary mechanisms between the spindles of the machine tools and the drive motors. Such motor-incorporated spindle head units, however, suffer from thermal deformation to their spindles, bearing boxes, outer casings, and other mechanical elements due to heat generated from their drive motors. As a result, use of such spindle head units for machining with cutting tools or workpiece holders attached thereto inevitably results in low machining accuracy.

It has been understood that to prevent thermal deformation of mechanical element of motor-incorporated spindle head unit, some appropriate cooling system has to be provided therein to remove the heat from the drive motor, especially, the stator assembly of the AC drive motor. Up until now, however, no concrete designs have been proposed for motor-incorporated spindle head units having built-in compact cooling systems.

Here, it should be understood that a cooling system assembled in a motor-incorporated spindle head unit has to also effectively prevent direct transmission of large amounts of heat generated from the excitation windings of the stator assembly of the drive motor to the mechanical elements, especially the front part of the spindle. This is because if such heat is directly transmitted to the front part of the spindle, not only the spindle itself but also the cutting tools or the workpiece holders will be subjected to thermal deformation, resulting in low machining accuracy.

SUMMARY OF THE INVENTION

An object of the present invention is therefore to provide a motor-incorporated spindle head unit including therein a cooling system effective for removing heat from the surface of a stator assembly of the motor.

Another object of the present invention is to provide a motor-incorporated spindle head unit of the type defined in the above object and further including an internal structure capable of preventing direct transmission of heat from the stator assembly of the motor to the front part of the spindle of the motor-incorporated spindle head unit.

In accordance with the present invention, a motor-incorporated spindle head unit adapted to be assembled in a machine tool is provided. The spindle head unit comprises an outer framework having therein a mounting space; a spindle extending axially in the mounting space of the outer framework and having front and rear end parts thereof; bearings for supporting the spindle in the mounting space so as to be rotatable about an axis of the spindle; a drive motor for the spindle, incorporated in the mounting space of the outer framework and including a rotor assembly, fixed on the spindle to be rotatable with the spindle, and a stator assembly, arranged around the rotor assembly with an annular space between the stator assembly and the outer framework, the annular space being connected to the outer atmosphere via air ports formed at part of the framework; a stator holder for holding the stator assembly in the mounting space, the stator holder defining at least an axial through-bore having one end fluidly interconnected with the annular space in the mounting space and the other end fluidly connected to the outside of the outer framework; and a unit for forming a stream of cooling air which passes through the annular space and the axial throughbore and is discharged to the outside of the outer framework. The stator assembly is held by the stator holder in a cantilever fashion, thereby being thermally isolated from the front part of the spindle.

BRIEF DESCRIPTION OF THE DRAWING

The present invention will be made more apparent from the ensuing description of an embodiment with reference to the accompanying drawings, wherein.

DESCRIPTION OF THE PREFERRED EMBODIMENT

Figure 1:
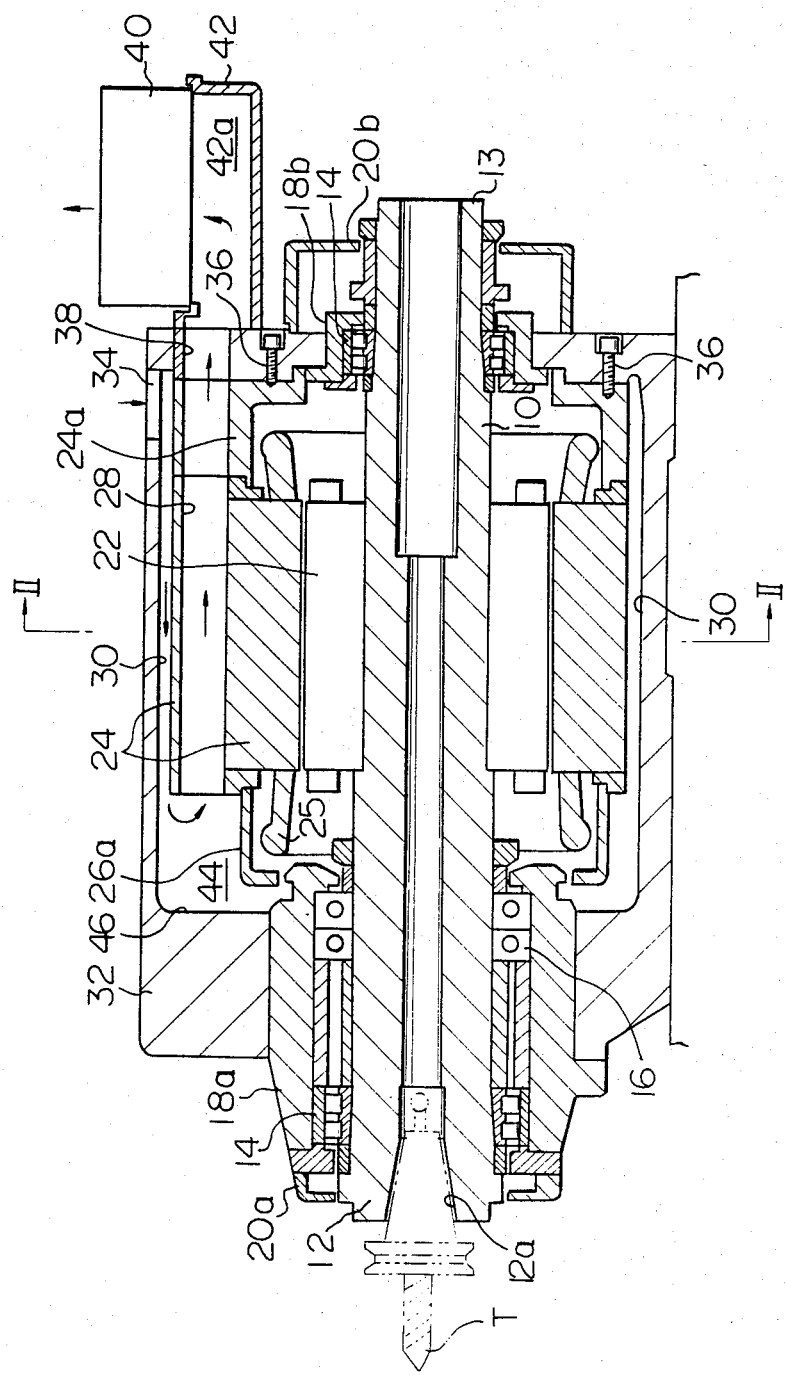
FIG. 1 is a longitudinal cross-section of a motor-incorporated spindle head unit, taken along the line I—I of FIG. 2, according to an embodiment of the present invention.
Figure 2:
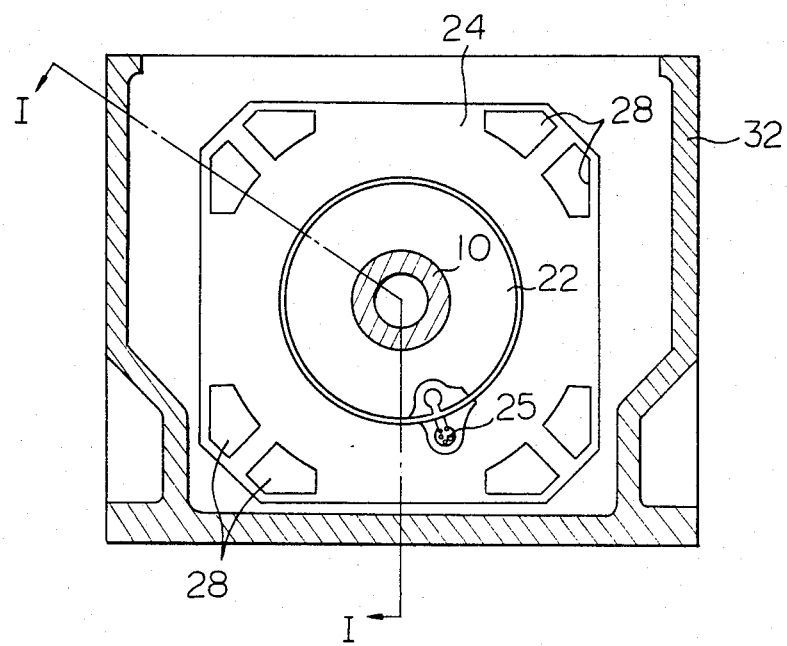
FIG. 2 is a cross-section of the spindle head unit taken along the line II—II of FIG. 1.

In FIGS. 1 and 2, the spindle head unit includes a spindle 10 having axially front and rear end parts 12 and 13. The spindle 10 is rotatably supported by radial bearings 14 arranged at axially opposite ends of the spindle 10 and thrust bearings 16 arranged at the rearmost position of the front end part 12. The front end part 12 of the spindle 10 is formed with a tapered bore 12a in which a cutting tool T or a workpiece holder is snugly received. The rear end part 13 of the spindle 10 is provided for mounting thereon a rotation detector, such as a rotary encoder (not shown), for detecting the rotary speed of the spindle 10. The bearings 14 and 16 are housed in front and rear bearing boxes 18a and 18b which are fixed in an outer framework 32 of the spindle head unit. Alternatively, the bearing boxes 18a and 18b may be formed integrally with the outer framework 32. Front and rear covering 20a and 20b are arranged for protecting the bearings 14 and 16 from contamination by foreign matter. The outer framework 32 may be used for mounting the spindle head unit on the body of a machine tool. To a substantially middle part of the spindle 10, a rotor assembly 22 of a drive motor, i.e., an AC drive motor, is fixed by means of an appropriate fixing element, such as a key. That is, the rotor assembly 22 is rotatable with the spindle 10. A stator assembly 24 of the drive motor is stationarily and coaxially arranged around the rotor assembly 22 with a small air gap remaining between both assemblies. The stator assembly 24 is held by a stator holder 24a which is fixed to a rear end wall of the outer framework 32 by means of screw bolts 36 in a cantilever fashion. A covering 26a is provided for the stator assembly 24. The positional relationship between the rotor assembly 22 and the stator assembly 24 is adjusted when the latter assembly 24 is fixed to the outer framework 32. At this stage, it is to be understood that since the stator assembly 24 includes excitation windings 25 to which electric current is supplied for causing the rotation of the rotor assembly 22, heat is generated from the stator assembly 24 while the drive motor is being operated. However, mounting of the stator assembly 24 in a cantilever fashion on the rear end wall of the outer framework 32 is effective for preventing direct transmission of the heat to the front end part 12 of the spindle 10, the front bearing box 18a, and cutting tools or workpiece holders T fitted in the tapered bore 12a of the spindle 10. Further a cooling system as described hereinbelow is provided in the spindle head unit for forcibly removing the heat from the stator assembly 24. That is, the stator assembly 24 and the stator holder 24a are formed with a plurality of substantially axial through-bores 28. One end of each through-bore 28 is opened toward a space 44 formed inside the outer framework 32. The space 44 is arranged adjacent to the front bearing box 18a. The other end of each through-bore 28 is aligned with a corresponding bore 38 formed in the rear end wall of the outer framework 32. The bores 38 are commonly interconnected with an air passage 42a of the duct 42 having, at a part thereof, a fan 40 operable to discharge air out of the passage 42a of the duct 42. The through-bores 28 of the stator assembly 24 and stator holder 24a are fluidly interconnected with an annular passage 30 provided between the inside wall of the outer framework 32 and the outer surfaces of the stator assembly 24 and the stator holder 24a, via the space 44. The annular passage 30 is fluidly connected to the outer atmosphere via a plurality of air ports 34 formed in the rear end part of the outer framework 32. Thus, when fan 40 is operated, air enters into the annular passage 30 via the air ports 34 and advances through the space 44 and the through-bores 28 until it reaches the air passage 42a of the duct 42. Subsequently, the air in the passage 42a is discharged outside. That is, the stream of air from the air port 34 to the outside of the fan 40 is formed as shown by arrows in upper half of FIG. 1. This stream of air removes heat generated from the stator assembly 24 to cool the assembly 24. At this state, it is to be noted that an end wall 46 of the outer framework 32 contributes to changing of the direction of the stream of air, so that the stream of air coming from the annular space 30 goes into the through-bores 28 of the stator assembly 24. It is also to be noted that since the fan 40 operates so as to forcibly discharge the air from the inside of the spindle head unit toward the outside thereof, no heated air remains within the spindle head unit.

In the case of the described embodiment, equiangularly arranged four pairs of through-bores 28 are formed in the stator assembly 24, as illustrated in FIG. 2. However, the number of the through-bores 28 may be increased or decreased as required.

From the foregoing description, it will be understood that in accordance with the present invention, there is provided a motor-incorporated spindle head unit including therein a cooling system capable of removing heat generated from the incorporated motor. Further, in accordance with the present invention, the internal structure of the motor-incorporated spindle head unit is improved so as to prevent direct transmission of heat generated from the stator assembly of the drive motor to the spindle and the front bearings. Accordingly, thermal deformation of the spindle and the bearings due to heat is effectively avoided. Consequently, accuracy of the machining operation is ensured by the use of the spindle head unit of the present invention.

We claim:

1. A spindle head unit for use in a machine tool, comprising:

an outer framework having a mounting space therein;

a spindle extending axially in said mounting space of said outer framework, said spindle having front and rear portions, wherein said spindle includes a bore in the front portion thereof for receiving a tool therein;

front bearing means for supporting the front portion of said spindle and rear bearing means for supporting the rear portion of said spindle, wherein said spindle is rotatable about the axis thereof;

a drive motor for said spindle, in said mounting space, said motor including a rotor assembly rotatably fixed on said spindle and a stator assembly disposed around said rotor assembly with an annular space between said stator assembly and said outer framework, said annular space being connected to the atmosphere via air ports formed in said outer framework, wherein a gap is formed between said stator assembly and said front bearing means such that said front bearing means does not contact said stator assembly;

holding means for holding said stator assembly in said mounting space, said holding means defining at least an axial through-bore having one end fluidly interconnected with said annular space in said mounting space and the other end fluidly connected to the outside of said outer framework, wherein said holding means are cantilever holding means for holding only the rear portion of said stator assembly, thereby thermally isolating said stator assembly from the front portion of said spindle; and a means for forming a stream of cooling air, wherein the stream of cooling air passes through said annular space and said axial through-bore and is then discharged to the outside of said outer framework.

2. A spindle head unit according to claim 1, wherein said air ports of said outer framework are formed at a rear end portion of said outer framework thereby introducing air from the atmosphere into said annular space.

3. A spindle head unit according to claim 1, wherein said through-bores of said holding means are substantially aligned with corresponding bores formed in the end wall of said outer framework.

4. A spindle head unit according to claim 1, wherein said means for forming a stream of cooling air comprises a duct attached to a rear end of said outer framework and having therein an air passage commonly connected to the through-bores of said holding means and a fan operable to discharge air from said air passage of said duct to said outside of said outer framework.

* * * * *